2 Sheets—Sheet 1.

W. F. OSGOOD.

CORN-PLANTER.

No. 6,906. Reissued Feb. 8, 1876.

Witnesses:
Fred Gus. Dietrich.
Daniel Breed.

F. B. Hunt & Co.
Assignees of
William F. Osgood

N. PETERS, PHOTO-LITHOGRAPHER, WASHINGTON, D. C.

2 Sheets—Sheet 2.
W. F. OSGOOD.
CORN-PLANTER.
No. 6,906. Reissued Feb. 8, 1876.
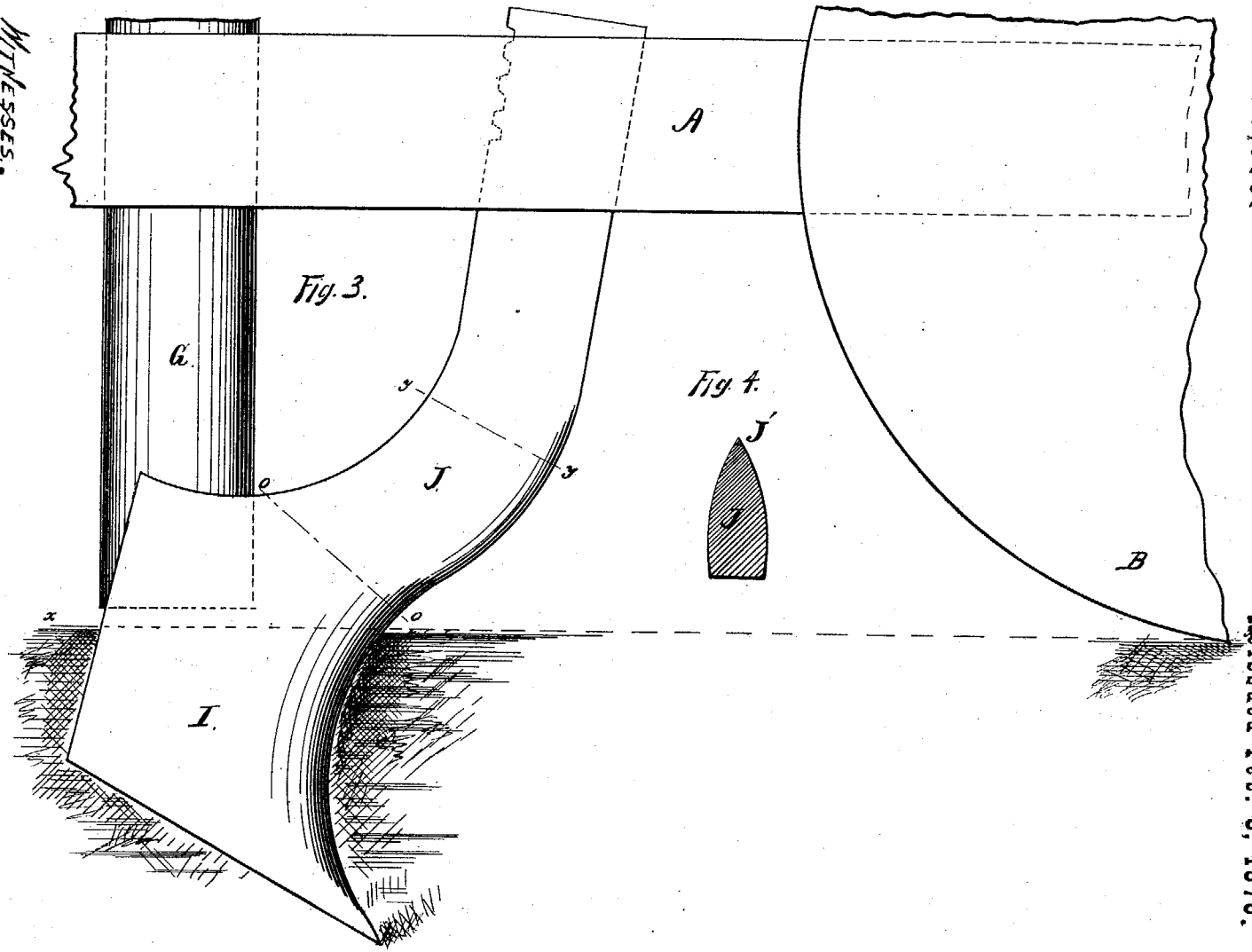
WITNESSES.
Fred. L. Dieterich
Daniel Breed
F. B. Hunt & Co.
Assignees of
William F. Osgood.
N. PETERS, PHOTO-LITHOGRAPHER, WASHINGTON, D. C.

UNITED STATES PATENT OFFICE.

WILLIAM F. OSGOOD, OF LOWELL, MASSACHUSETTS, ASSIGNOR, BY MESNE ASSIGNMENTS, TO F. B. HUNT & CO., OF RICHMOND, INDIANA.

IMPROVEMENT IN CORN-PLANTERS.

Specification forming part of Letters Patent No. 41,263, dated January 12, 1864; reissue No. 6,906, dated February 8, 1876; application filed October 12, 1875.

*To all whom it may concern:*

Be it known that I, WILLIAM F. OSGOOD, of Lowell, county of Middlesex and State of Massachusetts, have invented certain Improvements in Seed Planters or Drills, of which the following is a specification:

My invention consists, first, in a new combination of devices for planting either in hills or drills; and, secondly, in a novel arrangement or combination of a grain tube, colter, or fender, and a pilot-wheel having its axis on a line, or nearly on a line, with junction of the colter with the frame of the machine, as will be fully described hereafter.

Figure 1:
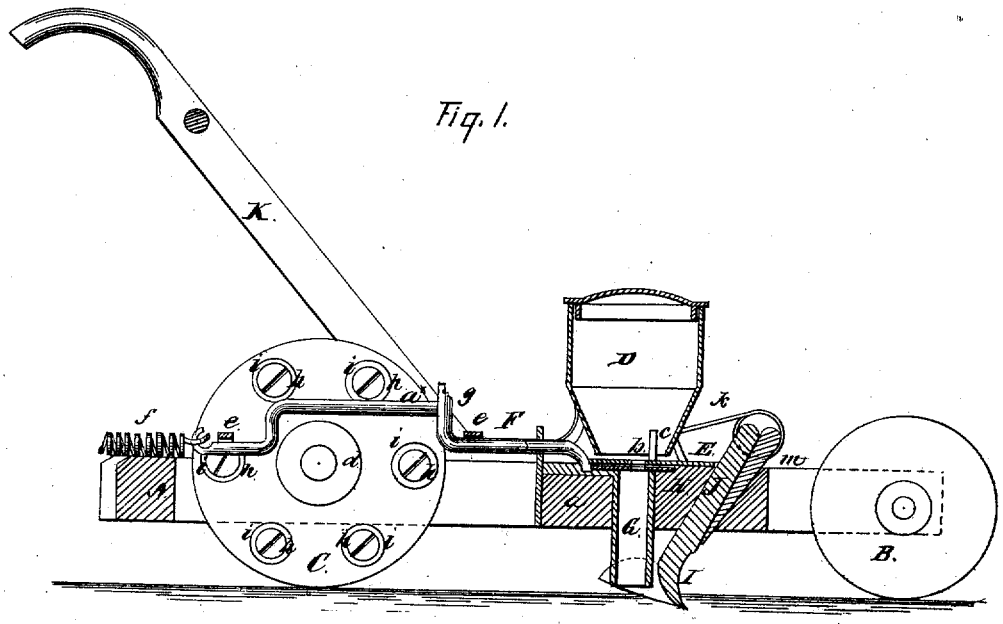
Figure 2:
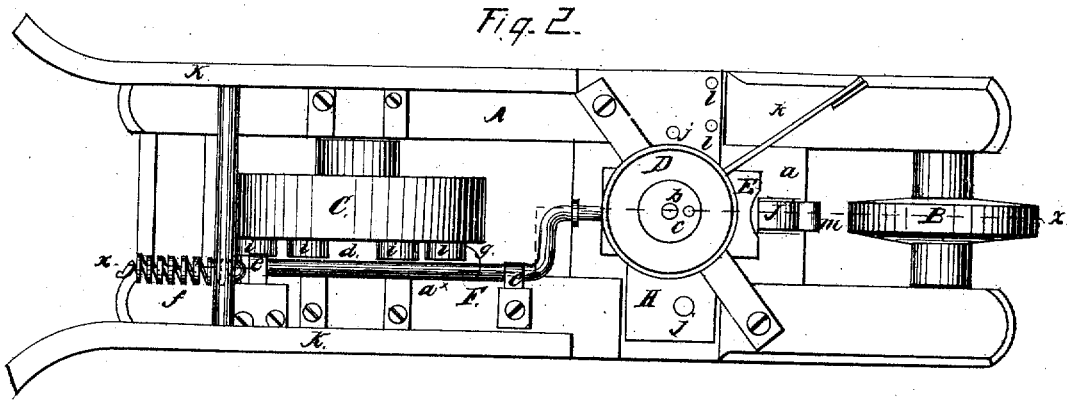

Figure 1 is a vertical longitudinal section taken at the line X X, Fig. 2. Fig. 2 is a top view. Fig. 3 is a detached and enlarged view of parts of the machine shown in this figure, showing the relation of the grain tube, colter, or fender, and pilot-wheel to each other. Fig. 4 is a cross-section of the colter.

In the drawing the frame of the machine is shown at A, having a pilot-wheel, B, and a rear wheel, C. This frame carries a seed-hopper, D, and is provided with ordinary handles K. A bent rod, F, is held by and slides in guides *e e*, its rear end being attached to a coiled spring, *f*, while the front end is attached to the feed-slide E, and a reciprocating motion is given to both the rod and slide by means of friction-rollers *i*, which successively strike the projection *g* on the rod F as the wheel C travels forward. By using all the rollers *i* the seed is sown in drills. To plant in hills a smaller number is used, as circumstances may require. The lower feed-slide H is held in place by a spring-hook, *k*, when adjusted to regulate the amount of seed to be dropped, which is accomplished by adjusting the series of holes *j*, so as to bring a larger or smaller hole in line with the hole *b* in the slide E.

The second part of my invention relates to planters or drills having a grain-tube which reaches well down toward the ground, in order to guide and deposit the grain accurately, and having a colter or fender placed in front of this grain-tube to protect the tube and cut through clods and other obstructions, and having a pilot-wheel having its axis on a line, or nearly on a line, with the point where the colter is attached to the frame, this pilot-wheel being in line with and in front of the colter, and acting in conjunction with the same to clear the way for and protect the grain-tube, the whole being poised upon this front or pilot-wheel precisely in the manner of an ordinary wheelbarrow when the rear end of the machine is lifted from the ground, and the tread of the wheel being the pivot upon which the whole turns when thus lifted, and is distinguished from those having caster-wheels and other wheels whose axis is removed from the frame, by attaching the axis to the frame in any suitable manner, the drill being wielded with greater ease and precision than when a caster-wheel is used, or a wheel whose axis is removed from the frame, as the weight of the machine is thrown almost entirely below a line drawn from the handles of the machine to the axis of the wheel, which is calculated to make the machine much more steady and easily handled than when the axis is removed from the frame.

I do not wish to confine myself to the precise manner shown of attaching the axis, as any ordinary bearings may be attached to the frame either above or below the same, so long as the axis is not materially removed from the frame.

The grain-tube, the colter, and the tread of the wheel are in line, the colter and wheel acting conjointly to protect the tube, and if the wheel fails to remove an obstruction the colter will protect the tube, and if weeds catch on the colter and drag they will slide down the oblique front edge to the line *o o*, Fig. 3, and thus be cut through or otherwise be removed from obstructing the machine. The furrow-opener I works in the ground up to the line X X, Fig. 3, and that part of the colter between the line Y Y and O O extends obliquely downward and backward, and serves the double purpose of carrying the furrow-opener, and of acting as an oblique fender to protect the grain-tube G. This colter or fender is made sharp in front, as seen at J′, Fig. 4, for the purpose of cutting through clods or other obstructions.

I am aware that a pilot-wheel in a seed planter or drill is not new; but I believe the following combination is new: The combination, in a seed-drill, of the seed-tube, the colter, and a pilot-wheel, having its axis on a line, or nearly on a line, with the point where the colter is connected to the frame; the tread of the wheel, colter, and grain-tube being in line and acting conjointly, as described, and making the machine short, compact, and easily handled, and differing widely from the class of machines which have runners or horizontal elongated furrow-openers; the seed-tube being attached to the upper side of the rear end of the runner, while the seed-tube in my machine is detached and reaches well down toward the ground, and being protected by a separate colter, the tube and front wheel being in close proximity; whereas in the class above referred to the machine is especially unwieldy, not only from the great distance from the tube to the front wheel, but the long runner, besides making the machine heavy, is always catching in the ground in turning, unless uncomfortably lifted behind.

Having thus fully described my invention, I claim—

1. The bar F, in combination with the spring *f*, slide E, and wheel C, provided with rollers *i*, substantially as set forth.

2. I claim a colter or fender, in combination with a grain-tube and pilot-wheel, substantially as set forth.

3. I claim the combination, in a seed-drill, of a seed-tube, a colter, and the pilot-wheel having its axis on a line, or nearly on a line, with the point where the colter is connected to the frame, substantially as described, for the purpose specified.

4. In a single-tooth corn-planter, I claim the above-described colter, for the threefold purpose of cutting through obstructions carrying the furrow-opener and protecting the grain-tube, substantially as described.

WM. F. OSGOOD.

Witnesses:

DANIEL A. EATON,
O. F. OSGOOD.